UNITED STATES PATENT OFFICE.

GADIENT ENGI AND HANS KAPPELER, OF BASEL, SWITZERLAND, ASSIGNORS TO SOCIETY OF CHEMICAL INDUSTRY IN BASLE, OF BASEL, SWITZERLAND.

BROWN VAT DYE AND PROCESS OF MAKING SAME.

940,586.  Specification of Letters Patent.  Patented Nov. 16, 1909.

No Drawing.  Application filed July 15, 1909.  Serial No. 507,823.

*To all whom it may concern:*

Be it known that we, GADIENT ENGI and HANS KAPPELER, both doctors of philosophy and chemists, citizens of the Swiss Republic, and residents of Basel, Switzerland, have invented new Brown Vat Dyestuffs and a Process of Making Same, of which the following is a full, clear, and exact specification.

According to this invention valuable brown vat dyestuffs are obtainable by treating 4:4′-diamidoindigo (compare *Monatshefte für Chemie* 1905, page 1262) with halogens or substances yielding halogen. Whereas the diamidoindigo possesses only small affinity for cotton fibers and dyes the latter poor and unsightly violet tinged brown tints, which, moreover, change their tint completely when washed, the halogen-substitution products of the diamidoindigo yield full red brown tints of excellent fastness to washing.

The following examples illustrate the invention, the parts being by weight.

*Example 1.*—1 part of 4:4′-diamidoindigo is introduced into 15 parts of bromin and the mixture is either stirred for about 48 hours at ordinary temperature in a suitable vessel or left to itself for a like period. The mass is then diluted with carbon tetrachlorid, filtered and the residue on the filter washed with carbon tetrachlorid and alcohol successively. The dyestuff thus obtained forms a brown powder which dissolves in concentrated sulfuric acid to a reddish blue solution passing to green blue on warming. Its solution in cold fuming sulfuric acid containing 24 per cent. of $SO_3$ is blue, but becomes grayish blue on warming. Hot nitrobenzene or toluene dissolves the dyestuff to a brown red solution. The bright yellow brown alkaline vat made from the dystuff dyes cotton bright and powerful red brown tints which when subsequently soaped become somewhat more reddish and exhibit excellent fastness to washing.

*Example 2.*—1 part of 4:4′-diamidoindigo is heated together with 5 parts of nitrobenzene and 1 part of bromin for two to three hours at 110–120° C. After cooling, the bromination product which has separated from the liquid is filtered, washed with alcohol and dried. The dyestuff thus obtained has properties similar to those of the product made according to Example 1.

*Example 3.*—4 parts of 4:4′-diamidoindigo are introduced into 100 parts of sulfuric acid of 93–94 per cent. strength, cooled to −5° C. and 4 parts of bromin are added. The temperature is then allowed to rise to 0° C. in the course of two to three hours and the mixture is stirred at this temperature for about 12 hours. Finally the mass is heated for some hours at 40°–50° C., and after cooling is introduced into water; the bromination product which separates is filtered and washed until neutral.

Instead of the solvents or diluents named in Examples 2 and 3, any other media suitable for halogenizing operations, such as glacial acetic acid, carbon tetrachlorid, dichlorobenzene, trichlorobenzene or the like, may be used.

The temperature named in the examples may be varied within wide limits, and the halogenizing operation may be aided by addition of a halogen carrier.

What we claim is:

1. The described process of making brown vat-dyestuffs, which consists in treating 4:4′-diamidoindigo with halogenating agents.

2. The described process of making brown vat-dyestuffs, which consists in treating 4:4′-diamidoindigo with bromin.

3. As new products the vat-dyestuffs, which can be obtained by treating 4:4′-diamidoindigo with halogenating agents, forming in dry state brown powders, soluble in concentrated sulfuric acid and in fuming sulfuric acid with a blue color, dissolving in hot nitrobenzene with brown color and dyeing cotton and wool from an alkaline vat brown shades.

4. As new products the vat-dyestuffs, which may be obtained by brominating 4:4′-diamidoindigo and which form in a dry state brown powders, soluble in concentrated sulfuric acid and in fuming sulfuric acid with a blue color, dissolving in hot nitrobenzene with brownish red to reddish brown color and dyeing cotton and wool from an alkaline vat reddish brown shades.

In witness whereof we have hereunto signed our names this sixth day of July 1909, in the presence of two subscribing witnesses.

GADIENT ENGI.
HANS KAPPELER.

Witnesses:
  GEORGE GIFFORD,
  AMAND BRAUN.